(12) United States Patent
Hettich et al.

(10) Patent No.: US 6,989,424 B2
(45) Date of Patent: Jan. 24, 2006

(54) CURING AGENT COMPONENT FOR AN AT LEAST TWO-COMPONENT MORTAR COMPOSITION, METHOD OF PREPARING IT AND ITS USE

(75) Inventors: Rainer Hettich, Munich (DE); Thomas Burgel, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 228 days.

(21) Appl. No.: 10/460,111

(22) Filed: Jun. 12, 2003

(65) Prior Publication Data

US 2003/0232909 A1    Dec. 18, 2003

(30) Foreign Application Priority Data

Jun. 14, 2002   (DE) ................................ 102 26 613

(51) Int. Cl.
*C08C 19/04*    (2006.01)
*C08F 8/08*    (2006.01)
(52) U.S. Cl. .................. 525/387; 106/802; 106/708
(58) Field of Classification Search ............... 525/387; 106/802, 708
See application file for complete search history.

(56) References Cited

U.S. PATENT DOCUMENTS 6,166,111 A * 12/2000 Schneider et al. .......... 523/501

FOREIGN PATENT DOCUMENTS

EP    0338983    9/1993

* cited by examiner

*Primary Examiner*—Robert D. Harlan
(74) *Attorney, Agent, or Firm*—Abelman, Frayne & Schwab

(57) ABSTRACT

A curing agent component is described for an at least two-component mortar composition for the chemical fastening technique, containing at least one free radical-forming agent as curing agent for an organic resin component, water and at least one water-soluble, ethylenically unsaturated polyethylene glycol derivative, which can be copolymerized with the organic resin component and has a solubility in water at 25° C. of at least 10 g in 100 gram of water and has the structure given by the general formula I:

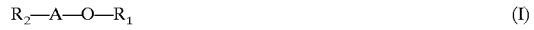

in which $R_1$ represents a group having the formula $CH_2=CH-CH_2-$, $CH_2=CH-CO-O-$ or $CH_2=C(CH_3)-CO-O-$, $R_2$ represents hydrogen, an alkyl group with 1 to 6 carbon atoms, a sulfonate group or a group having the formula $CH_2=CH-CH_2-$, $CH_2=CH-CO-O-$ or $CH_2=C(CH_3)-CO-O-$, and A represents a linear or branched, homopolymeric or copolymeric, optionally substituted polyoxyalkylene group. Furthermore, methods are described for producing and using the curing agent component in a two-component or multi-component mortar composition for fastening construction elements in a solid substrate.

18 Claims, No Drawings

US 6,989,424 B2

CURING AGENT COMPONENT FOR AN AT LEAST TWO-COMPONENT MORTAR COMPOSITION, METHOD OF PREPARING IT AND ITS USE

FIELD OF INVENTION

The present invention relates to a curing agent component for an at least two-component mortar composition for the chemical fastening technique, and a method of preparing it and its use as a curing agent constituent of a two- or multi-component mortar composition for fastening construction elements in solid substrates, especially for fastening anchor rods, reinforcing steel or the like in boreholes in concrete or stone.

BACKGROUND INFORMATION AND PRIOR ART

The at least two-component mortar compositions, used for the chemical fastening technique, generally contain a resin, which can be cured by free radical polymerization, in the one component, that is, the resin component (component "A"). Said resin is, for example, an unsaturated polyester resin, an epoxy acrylate resin or a urethane methacrylate resin, which may be dissolved in a copolymerizable reactive diluent, such as styrene or monomeric methacrylates. Aside from the resin, this resin component usually contains further additives, such as accelerators, inhibitors and the like, as well as fillers or thickening agents.

The second, necessary component of such a mortar composition for the chemical fastening technique, that is, the curing agent component (component "B") contains the free radical-forming agent, such as a peroxide or an azo compound, which is required for the polymerization of the curable resin. Since the amount of free radical-forming agent, required for the free radical polymerization of the resin component, is much less than the amount of resin in the resin component and, moreover, since the free radical-forming agents, namely peroxides, can decompose explosively, the curing agent component usually contains a carrier material or desensitizing agent, with which the volume of the curing agent component is brought to a reasonable value and the danger of exploding the free radical-forming agent is decreased.

Finally, it is possible to provide even other constituents, which react chemically with the resin component and the curing agent component, in one or more further components, in which these constituents present are separated from one another so that a premature reaction cannot occur.

When used in the proper manner, the components, namely the resin component and the curing agent component, present in separate containers such as multi-chamber containers, are mixed immediately before use, particularly by being pressed out of these containers and passed through a static mixer for mixing the constituents, after which the mixture obtained is brought into the borehole in the solid substrates. Subsequently, the fastening element, such as an anchor rod, a connecting reinforcement, reinforcing steel or the like is introduced and adjusted, before the mortar composition is cured by polymerization of the resin in the presence of the free radical-forming agent.

During the mixing of the curing agent component with the resin component, problems arise owing to the fact that, as a rule, the amount of curing agent, that is, of free radical-forming agent, such as the peroxide, is much less than the amount of the resin in the resin component. This makes the homogeneous mixing of these two constituents, required for achieving constantly good and reproducible strength values, considerably more difficult. On the other hand, certain free radical-forming agents, such as dibenzoyl peroxide, are solid, so that the curing agent component, as a rule, contains a diluent, in order to dissolve or disperse the free radical-forming agent and, overall, to increase its volume, so that it can be mixed more easily with the resin component. In this connection, volume relationships of resin component to curing agent component of 7:1 to 1:1 and preferably of 3:1 to 1:1 are preferred. Consequently, however, liquid carrier materials must be added to the curing agent component in amounts, which cannot be disregarded, in order to achieve this volume relationship.

According to the state of the art, so-called desensitizing agents, which, on the one hand, act as diluents and, on the other, avoid undesirable decomposition of the free radical-forming agents, are used to adjust the flowability and concentration of the free radical-forming agent in the curing agent component or the volume of the curing agent component. Various types of unreactive plasticizers, for example, dicarboxylate esters such as dioctyl phthalate and dioctyl adipate, or polyesters, have already been used as desensitizing agents. In this connection, reference is made to the DE-A-32 26 602 and the EP-A-0 432 087.

In the WO 94/19397, reactive constituents, such as liquid epoxides or isocyanates, which are incorporated in the resin matrix during the curing of the mortar composition, are proposed as desensitizing agents. On the other hand, the DE-A-42 31 161 discloses an organic/inorganic hybrid system, which enables water to be used as desensitizing agent. In both cases, however, a suitable reactant for the reactive carrier medium of the curing agent component is required in the resin component, since the desensitizing agents, known from the state of the art, cannot be incorporated by the free radical polymerization in the network formed.

A further disadvantage of the aqueous hybrid system consists therein that a curing agent component, formulated on this basis, can be used only at temperatures, which are not very far below 0° C., since such a component freezes easily, so that its use at a building site in the open is limited.

It has now turned out that the conventional formulations for forming curing agent components of such an at least two-component mortar composition for the chemical fastening technique are not fully satisfactory either because amounts of carrier materials, which adversely affect the strength properties of the cured mortar composition, must be introduced, or because additional constituents, which react with the carrier material of the curing agent components, must be added to the resin component, and that, furthermore, the stability of the conventional curing agent components, particularly with respect to the decomposition of the free radical-forming agent, is unsatisfactory.

It is therefore an object of the present invention to indicate a curing agent component for an at least two-component mortar composition for the chemical fastening component, with which not only it is possible, in a simple manner, to introduce the small amount of free radical-forming agent in the desired volume of a carrier material in such a manner, that the required flowability and concentration of the free radical-forming agent is achieved, a high stability of the curing agent component is ensured and, at the same time, no or only little additional material is introduced into the mortar composition, as a result of which better strength properties of the cured mortar composition are ensured.

It has turned out that this objective surprisingly can be accomplished owing to the fact that, aside from the free radical-forming agent, the curing agent component contains water and a water-soluble, ethylenically unsaturated polyalkylene glycol derivative, which can be co-polymerized with the organic resin component.

OBJECT OF THE INVENTION

The object of the invention therefore is the curing agent component of claim 1. The dependent claims relate to preferred embodiments of this inventive object, to a method for producing this curing agent component, as well as to its use as a curing agent constituent of a two-component or multi-component mortar composition for fastening construction elements, such as, in particular, anchor rods, reinforcing steel, construction elements or the like in solid substrates, especially in rock or concrete.

SUMMARY OF THE INVENTION

In particular, the invention relate to a curing agent component for an at least two-component mortar composition for the chemical fastening technique, containing at least one free radical-forming agent as curing agent for an organic resin component, water and at least one water-soluble, ethylenically unsaturated polyalkylene glycol derivative, which is capable of copolymerizing with the organic resin component and has a solubility in water of 10 g in 100 g of water at 25° C. and conforms to the general formula (I)

$$R_2-A-O-R_1 \quad (I)$$

in which $R_1$ represents a group having the formula $CH_2=CH-CH_2-$, $CH_2=CH-CO-O-$ or $CH_2=C(CH_3)-CO-O-$, $R_2$ represents hydrogen, an alkyl group with 1 to 6 carbon atoms, preferably a methyl group, a sulfonate group or a group having the formula $CH_2=CH-CH_2-$, $CH_2=CH-CO-O-$ or $CH_2=C(CH_3)-CO-O-$, and A represents a linear or branched, homopolymeric or copolymeric, optionally substituted polyalkylene oxide group.

The A group preferably is a homopolymeric or copolymeric polyoxyalkylene group, which is formed by the homopolymerization or copolymerization of ethylene oxide or propylene oxide. In the case of copolymers, the ethylene oxide groups and propylene oxide groups may be present randomly distributed or in blocks or also in the form of mixed blocks. In the case of a polyoxyalkylene group, the latter could be represented by the following formula:

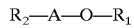

In the case of a homopolymeric polypropylene oxide group, group A can be represented by the following formulas:

According to a preferred embodiment, group A represents a copolymeric, optionally substituted polyoxyalkylene group, which is built up at random and/or in blocks. In accordance with a particularly preferred embodiment, the optionally substituted polyoxyalkylene group A is composed of polyethylene oxide groups and/or of the polypropylene oxide groups, which may be homopolymeric or copolymeric, the copolymeric groups being disposed randomly or in the form of blocks. Preferably, the polyoxyalkylene glycol derivatives corresponds to one of the following formulas (II) to (IV):

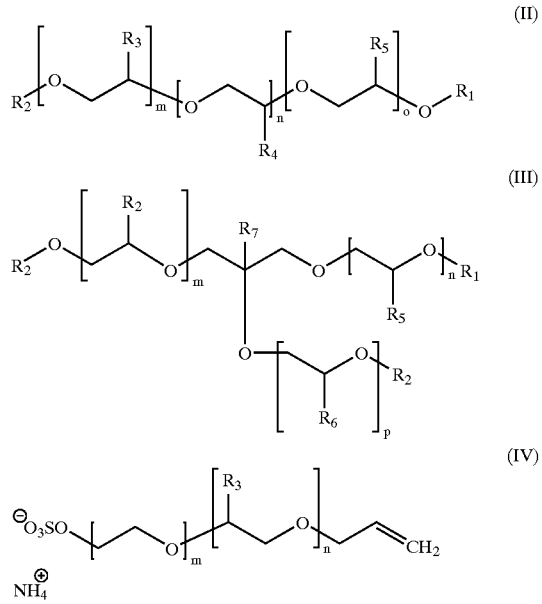

in which $R_1$ and $R_2$ have the meanings given above, $R_3$, $R_4$, $R_5$, $R_6$ and $R_7$, independently of one another, represent hydrogen or alkyl groups with 1 to 6 carbon atoms, preferably hydrogen or methyl groups, and n, m, o and p, with values of 0 to 200 and preferably of 0 to 100, independently of one another are whole numbers with values from the 0 to 200 with the proviso that the sum of n+m+o+p=5 to 300 and preferably 5 to 200, a the molecular weight of the polyalkyl derivative ranging from 250 to 20,000 g/mole and, particularly, from 500 to 5000 g/mole in accordance with a particularly preferred embodiment of the invention.

Polyalkylene glycol derivatives, particularly preferred pursuant to the invention, are selected from the group comprising polyethylene glycol allyl ethers, polyethylene glycol acrylates, polyethylene glycol methacrylates, methoxypolyethylene glycol-1100 methacrylates, polyethylene glycol dimethacrylates and/or polyethylene glycol co-propylene glycol allyl ethers with molecular weight from 250 to 5000 g/mole and, in particular, polyethylene glycol-750 allyl ether, polyethylene glycol-5000 allyl ether and methoxypolyethylene glycol-560 methacrylate The polyalkylene glycol derivatives, used pursuant to the invention, either are known and/or obtainable commercially or can be produced by someone, skilled in the art, from chemical synthesis procedures known from the literature, particularly by polycondensation of ethylene oxide and/or propylene oxide up to the desired molecular weight and introducing the $R_1$ and $R_2$ groups. It is also possible to start out from allyl alcohol or acrylic acid or methacrylic acid and build up the polyoxyalkylene group A by homopolymerization or copolymerization from ethylene oxide and propylene oxide. If this polycondensation starts out from a multihydric alcohol, such as 1,4-butylene glycol or 1,6-hexylene glycol, trimethylolpropane or pentaerythritol, branched polyoxyalkylene derivatives of the above formula (III) are obtained.

The compounds of the above formula (II), which are commercially available and the use of which is preferred pursuant to the invention, are, for example, polyethylene glycol allyl ethers, which are sold under the name of Polyglycol A500, A750, A1100, A5000, as well as polyethylene glycol co-propylene glycol allyl ethers, which are also sold under the name of Emulsogen AL250, also by the Clariant Co., polyethylene glycol acrylates, which are sold under the name of Sartomer, polyethylene glycol methacrylates, which are sold under the name of CD550 by the Cray Valley Co. and polyethylene glycol dimethacrylates, which are sold under the name of Sartomer 252 also by the Cray Valley Co., and methoxypolyethylene glycol-1100 methacrylate, which is obtainable from the Merck Co.

The inventive curing agent component, as free radical-forming agent, may contain peroxide and/or an azo compound, preferably an organic peroxide or an organic azo compound. Particularly preferred peroxides are alkyl peroxides, dialkyl peroxides, diacyl peroxides, alkyl hydroperoxides, hydroperoxides, percarbonates, perketals and/or inorganic peroxides. In accordance with a most preferred embodiment, the curing agent component contains, as free radical-forming agent, diacetyl peroxide, di-p-chlorobenzoyl peroxide, di-t-butyl peroxide, cumyl hydroperoxide, phthalloyl peroxide, succinyl peroxide, dilauryl peroxide, acetyl cycloheanesulfonyl peroxide, t-butyl perbenzoate, t-butyl peroctoate, cyclohexane percarbonate, bis(4-t-butyl-cyclohexyl) percarbonate, a silicon peroxide, acetyl acetone peroxide, cyclohexanone peroxide, methyl ethyl ketone peroxide, dibenzoyl peroxide, dilauryl peroxide and/or azobisisobutyronitrile. For processing at a temperature ranging from +25° C. to +60° C. and, with that, on the customary building sites in the open, the use of diacyl peroxides, such as dibenzoyl peroxide or dilauryl peroxide, is particularly preferred. The azo compound, preferred pursuant to the invention, is azobisisobutyronitrile.

Aside from the absolutely necessary constituents of free radical-forming agent, water and the polyalkylene glycol derivative, the inventive curing agent component may optionally contain additional, conventional, organic and/or inorganic fillers, thickening agents, agents providing thixotropic properties, unreactive solvents, materials for improving the flowability, accelerators, wetting agents and/or stabilizers. Preferably, the fillers consist of particles of quartz, quartz material, corundum, calcium carbonate, calcium sulfate, glass and/or organic polymers of different size and shape, such as sand or powder, in the form of spheres or hollow spheres, but also in the shape of fibers of organic polymers, such as polymethyl methacrylate, polyester, polyamide and also in the form of micro-spheres of polymers (perpolymers).

As thickening agent or material providing thixotropic properties, those based on silicates, bentonite, laponite, pyrogenic silica, polyacrylates and/or polyurethanes are preferred.

The amount of polyalkylene glycol derivative to be used, as well as the amount of water necessary for the flexibilization, depends essentially on the molecular weight of the compound used. Anyone, skilled in the art, is readily in a position to select the correct ratio of these constituents and also, optionally, the constituents, which are to be used, in such a manner, that the curing agent components as the viscosity and flowability required for metering and discharging over the static mixer.

In accordance with a preferred embodiment, the curing agent component contains
a) 1 to 30% by weight and preferably 5 to 20% by weight of at least one free radical-forming agent, preferably dibenzoyl peroxide or dilauryl peroxide,
b) 5 to 50% by weight and preferably 10 to 40% by weight of water
c) 3 to 50% by weight and preferably 10 to 40% by weight of at least one polyalkylene glycol derivative, as defined above, particularly of a polyethylene glycol-750 allyl ether, polyethylene glycol-5000 allyl ether and/or methoxy-polyethylene polyethylene glycol-560 methacrylate,
d) 0 to 70% by weight and preferably 5 to 50% by weight of at least one filler,
e) 0 to 10% by weight of at least one thickening agent or material producing thixotropic properties and
f) 0 to 10% by weight of at least one representative of the group comprising unreactive solvents, agents for improving the flowability, accelerators, wetting agents and/or stabilizers.

According to the claimed procedure, the inventive curing agent component is prepared owing to the fact that the constituents are mixed homogeneously and the desired the volume and aimed-for flowability are adjusted by the amounts of polyalkylene glycol derivative and of water, as well as optionally of a solvent, which have been selected.

The inventive curing agent component can be used in a two-component or multi-component mortar composition in combination with any resin components, which contain resins that can be polymerized by free radicals, for example, resin components based on unsaturated polyesters, vinyl esters, epoxy acrylates, urethane methacrylates, vinyl ethers and allyl ethers, which, optionally, in admixture with reactive diluents containing the ethylenically unsaturated structure elements, such as styrene, divinyl benzene, acrylic acid and/or methacrylic acid or their esters, such as methyl methacrylate, butyl methacrylate, butylene glycol di(meth) acrylate, ethylene glycol di(meth)acrylate, trimethylolpropane tri(meth)acrylate, pentaerythritol tetra(meth)acrylate and homologous derivatives thereof, as well as further monomers containing functional groups, such as hydroxyethyl or hydroxypropyl(meth)acrylate, aminoethyl(meth) acrylate, acetoacetatoethyl(meth)acrylate acrylamide derivatives thereof, butyl vinyl ether, diallyl adipate, diethylene glycol divinyl ether, hydroxy butyl vinyl ether and the like.

In addition, the resin component may contain the conventionally used fillers and/or reinforcing agents, such as silica and, in particular, pyrogenic silica, quartz sand and/or powdered quartz, glass spheres, hollow glass spheres, mica, cement, calcium carbonate and/or calcium sulfate, corundum, carbides, metal particles, heavy spar, synthetic and/or natural fibers, etc., as well as thickening agents and materials producing thixotropy, as already addressed above, as well as pigments and dyes.

Furthermore, it is possible to introduce a hydraulically setting compound, such as cement, preferably Portland cement, aluminate cement and/or plaster as fillers in the resin components, in order to bind in this way the or a portion of the water contained in the curing agent component.

After they are prepared separately, the inventive curing agent component and the resin component are kept in separate multi-chamber containers, from which they are pressed with the help of mechanical devices or with the help of a flowing agent and passed through a mixing device, preferably a static mixer. The curing mortar composition, emerging from the static mixer, is introduced directly into a borehole disposed in the solid substrate, into which the construction element that is to be fastened, such as an anchor rod, is introduced. With a processing time of, for example, 10 minutes and a curing time of at least one hour, excellent strength values of the construction element, fastened in the borehole, are obtained.

It has turned out that, due to the inventive use of the defined polyalkylene glycol derivative, not only the volume and the flowability of the curing agent component can be adjusted in this manner and that a simple and homogeneous mixing with the resin component can be achieved readily with the help of a static mixer, but also, at the same time, the stability of the curing agent component containing the free radical-forming agent can be ensured during storage and, at the same time, high load values of the cured mortar composition are achieved.

The following examples are in tended to explain the invention further.

EXAMPLE 1

The resin component and the inventive curing agent component of a two-component mortar composition are prepared by mixing the following components homogeneously:

Resin Component A:
  29% by weight of epoxy acrylate
  20% by weight of butylene glycol dimethacrylate
  19% by weight of cement
  28% by weight of quartz sand
  2.2% by weight of pyrogenic silica
  1.5% by weight of dimethyl-p-toluidine
  0.3% by weight of Ionol a (butyl hydroxytoluene)

Curing Agent Component B:
  15% by weight of polyethylene glycol-750 allyl ether
  10% by weight of polyethylene glycol-5000 allyl ether
  20% by weight of water
  15% by weight of dibenzoyl peroxide (75% aqueous)
  35% by weight of calcium carbonate and
  5% by weight of pyrogenic silica After the two components are prepared separately, they are mixed in a ratio of 3:1 by volume in a static mixer and introduced into a prepared borehole (diameter of 14 mm in C20 concrete, 130 mm deep). An anchor rod (M12, steel quality 10.9) is inserted and, after a curing time of one day at room temperature (25° C.), the force, required to extract the anchor rod, is measured with a hydraulic tool, with which such a force can be measured. The force measured here is 61 kN.

EXAMPLE 2

A resin component A and a curing agent component B are prepared from the following constituents:

Resin Component A:
  20% by weight of urethane methacrylate
  18% by weight of butylene glycol dimethacrylate
  4.8% by weight of isobornyl methacrylate
  10% by weight of methyl methacrylate
  42% by weight of quartz sand
  3.4% by weight of pyrogenic silica
  1.5% by weight of dimethyl-m-toluidine
  0.3% by weight of Ionol (butyl hydroxytoluene)

Curing Agent Component B:
  30% by weight of methoxypolyethylene glycol-560 methacrylate
  20% by weight of water
  10% by weight of dibenzoyl peroxide (75% aqueous)
  35% by weight of glass microspheres and
  5% by weight of pyrogenic silica After they are prepared, the two components are mixed in a ratio by volume of 5:1 and the extraction force, determined as described in Example 1 using an anchor rod M12 set in this mortar composition, is found to be 79 kN.

EXAMPLE 3

A resin component A and a curing agent component B are prepared from the following constituents:

Resin Component A:
  30% by weight of unsaturated polyester,
  20% by weight of styrene,
  5.2% by weight of divinyl benzene
  40% by weight of quartz sand and
  3% by weight of pyrogenic silica
  1.5% by weight of dimethylaniline
  0.3% by weight of Ionol (butyl hydroxytoluene)

Curing Agent Component B:
  35% by weight of polyethylene glycol-500 allyl ether
    10% by weight of water 15% by weight of dibenzoyl peroxide (75% aqueous) 35% by weight of glass microspheres and 5% by weight of pyrogenic silica After they are prepared, the two components are mixed in a ratio by volume of 3:1 and the extraction force, determined as described in Example 1 using an anchor rod M12 set in this mortar composition, is found to be 68 kN.

What is claimed is:

1. A curing agent component for an at least two-component mortar composition for chemical fastening technique, comprising
  a) at least one free radical-forming agent as curing agent for an organic resin component
  b) water and
  c) at least one water-soluble, ethylenically unsaturated polyalkylene glycol derivative, capable of copolymerizing with the organic resin component and having a solubility in water at 25° C. of at least 10 g in 100 g of water and the following general formula I:

$$R_2-A-O-R_1 \qquad (I)$$

in which
  R1 represents a group having the formula CH2=CH—CH2—, CH2=CH—CO—O— or CH2=C(CH3)—CO—O—,
  R2 represents hydrogen, an alkyl group with 1 to 6 carbon atoms, a sulfonate group or a group having the formula CH2=CH—CH2—, CH2=CH—CO—O— or CH2=C(CH3)—CO—O—, and A represents a linear or branched, homopolymeric or copolymeric, optionally substituted polyoxyalkylene group.

2. The curing agent component of claim 1, wherein the group A represents a copolymeric polyoxyalkylene group, which is constructed randomly and/or in blocks and optionally is substituted.

3. The curing agent composition of claim 1 or 2, wherein the optionally substituted polyoxyalkylene group A consists of polyethylene oxide groups and/or of polypropylene oxide groups.

4. The curing agent, component of claim 1 or 2, wherein the polyalkylene glycol derivative correspondence to one of the general formula is (II) to (IV), in which

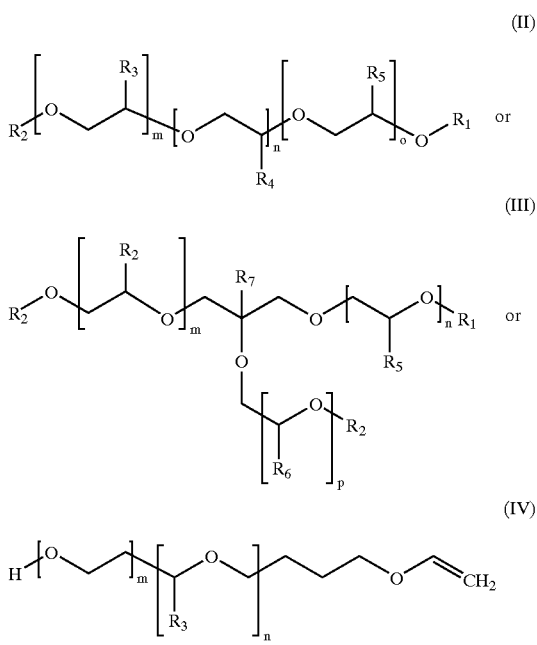

in which
R1 and R2 have the meanings claimed,
R3, R4, R5, R6 and R7, independently of one another, represent hydrogen or alkyl groups with 1 to 6 carbon atoms and
n, m, o and p, independently of one another are whole numbers with values from the 0 to 200, with the proviso that the sum of n+m+o+p=5 to 300.

5. The curing agent component of claim 1, wherein it contains a polyalkylene glycol derivative selected from polyethylene glycol allyl ethers, polyethylene glycol acrylates, polyethylene glycol methacrylates, methoxypolyethylene glycol-1100 methacrylates, polyethylene glycol dimethacrylates and/or polyethylene glycol co-propylene glycol allyl ethers with molecular weights from 250 to 5000 g/mole.

6. The curing agent component of claim 1, wherein it contains, as polyalkylene glycol derivative, a representative of the group comprising polyethylene glycol-750 allyl ether, polyethylene glycol-5000 allyl ether and/or methoxypolyethylene glycol-560 methacrylate.

7. The curing agent component of claim 1, wherein it contains a peroxide or an azo compound as free radical-forming agent.

8. The curing agent component of claim 7, wherein it contains an organic peroxide and/or an inorganic azo compound as free radical-forming agent.

9. The curing to component of claim 8, wherein it contains an alkyl peroxide, a diacyl peroxide, a dialkyl peroxide, an alkyl hydroperoxide, a hydroperoxide, a percarbonate, a perketal and/or an inorganic peroxide.

10. The curing agent component of claim 9, wherein it contains diacetyl peroxide, di-p-chlorobenzoyl peroxide, di-t-butyl peroxide, cumyl hydroperoxide, phthalloyl peroxide, succinyl peroxide, dilauryl peroxide, acetyl cyclohexanesulfonyl peroxide, t-butyl perbenzoate, t-butyl peroctoate, cyclohexane percarbonate, bis( 4-t-butylcyclohexyl) percarbonate, a silicon peroxide, acetyl acetone peroxide, cyclohexanone peroxide, methyl ethyl ketone peroxide, dibenzoyl peroxide, dilauryl peroxide and/or azobisisobutyronitrile as free radical-forming agent.

11. The curing agent component of claim 1, wherein it additionally contains organic and/or inorganic fillers, thickening agents, materials producing thixotropic properties, unreactive solvents, materials for improving the flowability, accelerators, wetting agents and/or stabilizers.

12. The curing agent component of claim 11, wherein it contains particles of quartz, quartz material, corundum, calcium carbonate, calcium sulfate, glass and/or an organic polymer as organic or inorganic filler.

13. The curing agent component of claim 12, wherein the filler particles are shaped irregularly, spherically, as hollow spheres and/or as fibers.

14. The curing agent component of claim 12 or 13, wherein the filler particles consist of a polymer, preferably polymethyl methacrylate, a polyester and/or a polyamide.

15. The curing agent component of claim 11, wherein it contains a thickening agent or a material producing thixotropic properties based on silicates, bentonite, laponite, pyrogenic silica, polyacrylates and/or polyurethanes.

16. The curing agent component of claim 10, wherein are contained:
a) 1 to 30% by weight of the free radical-forming agent,
b) 5 to 50% by weight of water,
c) 3 to 50% by weight of the at least one polyalkylene glycol derivative,
d) 0 to 70% by weight of at least one of an organic polymer as an organic filler and particles of quartz material, corundum, calcium carbonate, calcium sulfate, and/or glass as an inorganic filler,
e) 0 to 10% by weight of at least one thickening agent or material producing thixotropic properties and
f) 0 to 10% by weight of at least one representative of the group comprising unreactive solvents, agents for improving the flowability, accelerators, wetting agents and/or stabilizers.

17. A method of preparing a curing agent component for at least two-component mortar composition for chemical fastening technique comprising
a) at least one free radical-forming agent as curing agent for an organic resin component
b) water and
c) at least one water-soluble, ethylenically unsaturated polyalkylene glycol derivative, capable of copolymerizing with the organic resin component and having a solubility in water at 25° C. of at least 10 g in 100 g of water and the following general formula I:

in which
R1 represents a group having the formula CH2=CH—CH2—, CH2=CH—CO—O— or CH2=C(CH3)—CO—O—,
R2 represents hydrogen, an alkyl group with 1 to 6 carbon atoms, a sulfonate group or a group having the formula CH2=CH—CH2—, CH2=CH—CO—O— or CH2=C(CH3)—CO—O—, and A represents a linear or branched, homopolymeric or copolymeric, optionally substituted polyoxyalkylene group,
wherein the at least one three radical-forming agent, water, at least one polyalkylene glycol derivative, optionally at least one filler, optionally at least one thickening agent or material producing thixotropic properties and at least one representative of the group comprising unreactive solvents, materials for improving the flowability, accelerators, wetting agents and/or stabilizers, are mixed homogeneously and, by selecting the amount of polyalkylene glycol derivative, water and optionally a solvent, brought to the desfred volume and the desired flowability.

18. A method of fastening construction elements in a solid substrate with a two-component or multi-component mortar composition, wherein there is added to the composition a curing agent component comprising
   a) at least one free radical-forming agent as curing agent for an organic resin component
   b) water and
   c) at least one water-soluble, ethylenically unsaturated polyalkylene glycol derivative, capable of copolymerizing with the organic resin component and having a solubility in water at 25° C. of at least 10 g in 100 g of water and the following general formula I:

$$R_2-A-O-R_1 \qquad (I)$$

in which
   R1 represents a group having the formula $CH2=CH-CH2-$, $CH2=CH-CO-O-$ or $CH2=C(CH3)-CO-O-$,
   R2 represents hydrogen, an alkyl group with 1 to 6 carbon atoms, a sulfonate group or a group having the formula $CH2=CH-CH2-$, $CH2=CH-CO-O-$ or $CH2=C(CH3)-CO-O-$, and A represents a linear or branched, homopolymeric or copolymeric, optionally substituted polyoxyalkylene group.

* * * * *